United States Patent [19]

Franck et al.

[11] Patent Number: 5,114,650
[45] Date of Patent: May 19, 1992

[54] EXTRUSION SHAPING METHOD

[75] Inventors: Donald L. Franck, Warren; Suresh D. Shah, Rochester Hills; Manu K. Sheth, Troy; Lawrence D. Zabel, Mt. Clemens, all of Mich.

[73] Assignee: General Motors Corporation, Detroit, Mich.

[21] Appl. No.: 685,932

[22] Filed: Apr. 16, 1991

Related U.S. Application Data

[63] Continuation-in-part of Ser. No. 434,156, Nov. 13, 1989, abandoned.

[51] Int. Cl.⁵ .................. B29C 47/00; B29C 47/02
[52] U.S. Cl. .................. 264/151; 264/157; 264/177.17; 264/177.2; 264/210.2; 264/211.13; 264/279.1; 264/294; 264/297.5; 264/325; 264/331.13; 264/331.17; 264/331.18
[58] Field of Search .......... 264/148, 149, 151, 157, 264/160, 171, 177.17, 177.2, 178 R, 210.2, 211.13, 237, 279.1, 294, 297.5, 322, 325, 331.13, 331.17, 331.18, 348

[56] References Cited

U.S. PATENT DOCUMENTS

| | | | |
|---|---|---|---|
| 3,320,225 | 5/1967 | Bradbury | 264/210.2 X |
| 3,387,069 | 6/1968 | Stohr | 264/151 X |
| 3,454,693 | 7/1969 | Crenshaw | 264/151 |
| 4,081,504 | 3/1978 | Wenrick et al. | 264/177.17 X |
| 4,261,940 | 4/1981 | Bussey, Jr. | 264/151 X |
| 4,563,320 | 1/1986 | Morgan | 264/151 |

FOREIGN PATENT DOCUMENTS

| | | | |
|---|---|---|---|
| 59-106947 | 6/1984 | Japan | 264/210.2 |
| 61-37411 | 2/1986 | Japan | 264/151 |
| 61-37412 | 2/1986 | Japan | 264/151 |
| 61-37413 | 2/1986 | Japan | 264/151 |

Primary Examiner—Leo B. Tentoni
Attorney, Agent, or Firm—Randy W. Tung

[57] ABSTRACT

A method of extruding a profiled strip of polymeric material off the extrusion die of a plastic extruder and immediately thereafter compression forming a predetermined section of the profiled strip into a predetermined shape when temperature of the polymeric material is sufficiently high to allow plastic flow in the profiled strip. The method including the steps of first extruding a profiled strip of polymeric material through the extrusion die and compression molding a predetermined section of the profiled strip into a predetermined shape at a close proximity from the extrusion die with a set of compression molding dies capable of traveling with the profiled strip at substantially the same speed for a sufficient length of time to permanently set the predetermined shape, disengaging the compression molding dies from the profiled strip at a predetermined distance from the extrusion die; cooling the profiled strip having the compression molded predetermined shape in a suitable cooling fluid such that the predetermined shape is permanently maintained, and then trimming the extruded profiled strip into discontinuous pieces each having the compression molded predetermined shape.

6 Claims, 4 Drawing Sheets

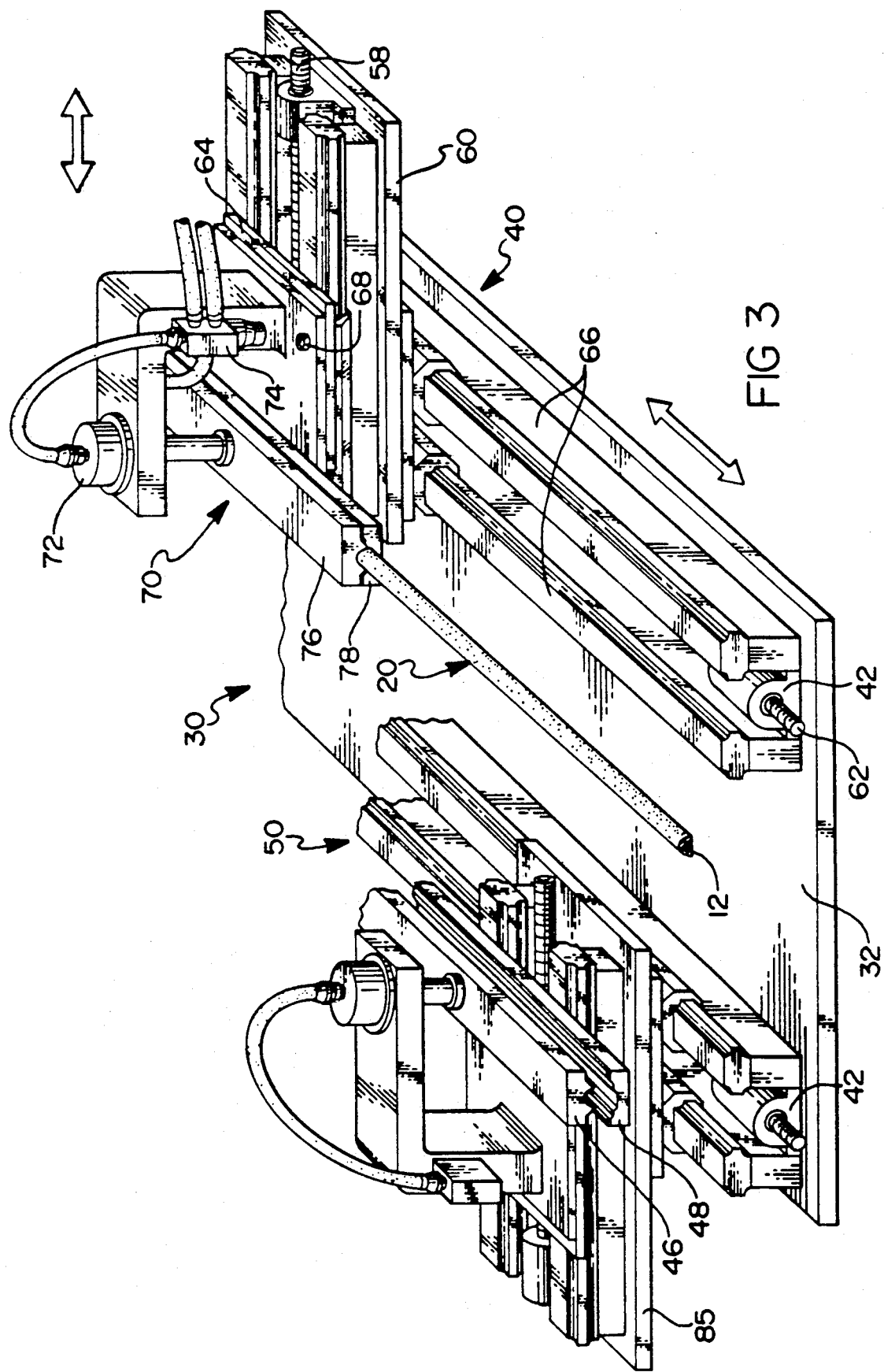

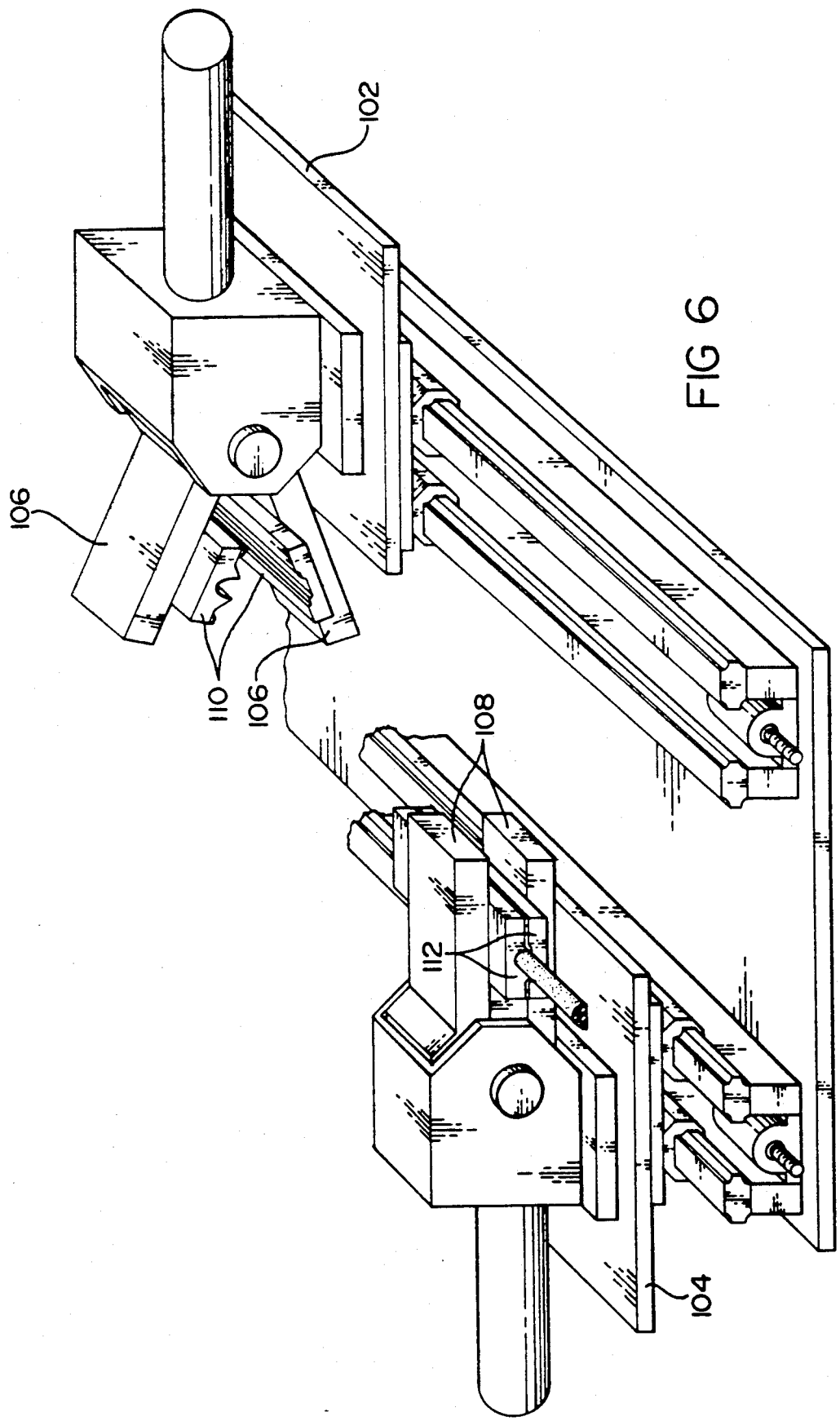

EXTRUSION SHAPING METHOD

This is a continuation-in-part of Ser. No. 07/434,156, filed on Nov. 13, 1989, now abandoned.

FIELD OF THE INVENTION

This invention generally relates to a method of extruding a profiled strip of polymeric material and, more particularly, relates to a method of extruding a profiled strip of polymeric material and immediately after extrusion, reshaping a leading and a trailing end of a molding piece in the strip by a set of compression molding dies such that molding pieces having prefinished ends are readily obtained after routing of the flash.

BACKGROUND OF THE INVENTION

Profiled strips extruded of polymeric materials are widely used in automobile body applications as molding pieces. Molding pieces such as body side moldings or wheel well moldings are used to protect a vehicle body from impact damage and to protect edges of sheet metal panels from corrosion. Most of these molding pieces are extruded of thermoplastic materials such as PVC (polyvinyl chloride), thermoplastic rubber, thermoplastic urethane, or other flexible polymeric materials. PVC is one of the most widely used materials for its low cost and good physical properties.

Molding pieces such as a body side molding may be extruded of a plastic material alone or extruded in an extrusion coating process where plastic material is extruded on a metal reinforcing substrate. In an extrusion coating process where plastic material is combined with a more rigid metal substrate, a cross-head extrusion technique is used. In cross-head extrusion, a continuous length of metal reinforcing substrate is pulled through an extrusion die at 90° angle to the direction of the plastic flow while molten plastic material is being extruded onto the metal substrate. The metal reinforcing substrate is usually cleaned and dried through a multistation process and formed by a series of metal roll formers prior to the entry into the extrusion die. However, such metal reinforcing substrate may also be in the form of a thin metal foil which does not require preforming.

In automobile body parts, the aesthetic appearance of the part is one of the most important criteria that must be satisfied. In the extrusion of vinyl or vinyl/metal substrate reinforced molding pieces, the quality of the appearance of the molding pieces obtained is dependent upon many variables. One of these variables is how well the ends of the molding pieces are finished.

Currently, the industry practice is to cut the continuous length extrudate into appropriate lengths in-line after cooling of the extrudate. Even though this is a relatively efficient process, the parts produced, particularly the shear cut ends, are crude and unfinished. The metal substrate running through the center of the extrusion is frequently exposed at both ends of the cut molding pieces which is aesthetically unacceptable.

It is, therefore, an object of the present invention to provide a method of extrusion shaping profiled strips of polymeric material with smooth finished ends.

It is another object of the present invention to produce extruded profiled strips of polymeric material that have substantially no exposed metal substrate in the ends.

It is a further object of the present invention to extrude profiled strips of polymeric material having smooth finished ends without using labor intensive secondary finishing steps.

SUMMARY OF THE INVENTION

The aforementioned objects can be achieved by the practice of our novel extrusion shaping technique. In our extrusion shaping technique, an extrudate, while still hot within approximately 5 seconds after exiting the extrusion die, is compression molded to form a leading and a trailing end of a molding piece by a set of matched molding dies. The extrudate is not allowed to cool to any significant degree between the extrusion die and the molding dies. The extrudate having finished leading and trailing ends of a molding piece is then cooled in a cooling tank prior to being cut into separate molding pieces.

In practice, two sets of matched molding dies are used to alternately synchronize with the extrudate at a suitable line speed, i.e., any speed between 10 to 50 feet per minute. Each set of molding dies is mounted on a reciprocating precision die carrier which allows lateral movement of the dies, while the die carrier is mounted on a reciprocating extensible shuttle to allow precision movement parallel to the extrudate. The extrusion die design, the die carrier design, and the extensible shuttle movement design are critical in the production of defect-free extruded molding pieces with finished ends. Imperfection in any of these three design areas would produce molding pieces with drag-type defects such as shock lines and dimensional variations.

BRIEF DESCRIPTION OF THE DRAWINGS

FIG. 3 is a perspective view of the die carriers and the extensible shuttles.

FIG. 6 is a perspective view of the die carriers in the alternate embodiment.

DETAILED DESCRIPTION OF THE PREFERRED EMBODIMENT

Figure 1:
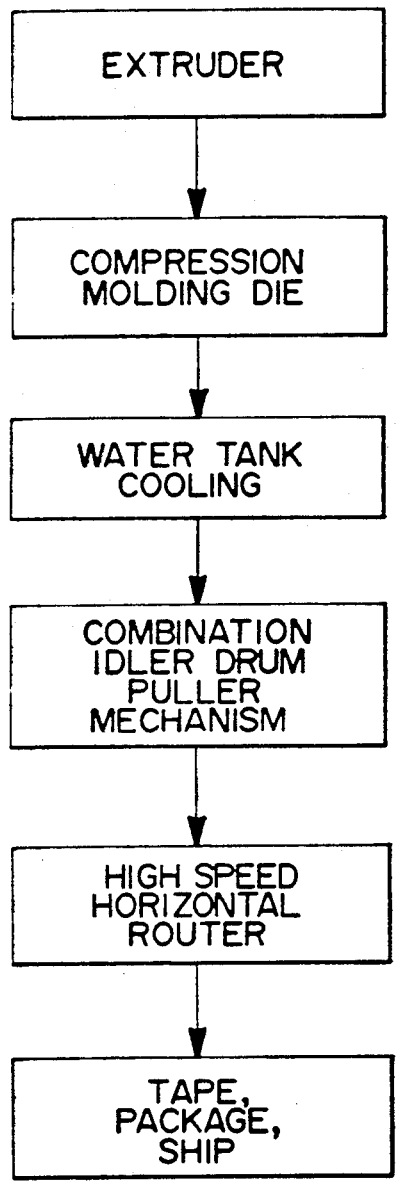
FIG. 1 is a flow chart showing the relevant steps of the extrusion shaping process.

In our preferred embodiment, a PVC extrudate is first made by extrusion coating a PVC resin composition onto a continuous length of reinforcing metal substrate. The extrudate is then compression molded to form a trailing and leading ends of a molding piece immediately after the extrusion die by a set of compression molding dies. A flow chart showing this process is shown in FIG. 1. The individual processing steps shown in FIG. 1 may be more easily explained by the schematic of the equipment set up shown in FIG. 2.

Figure 2:
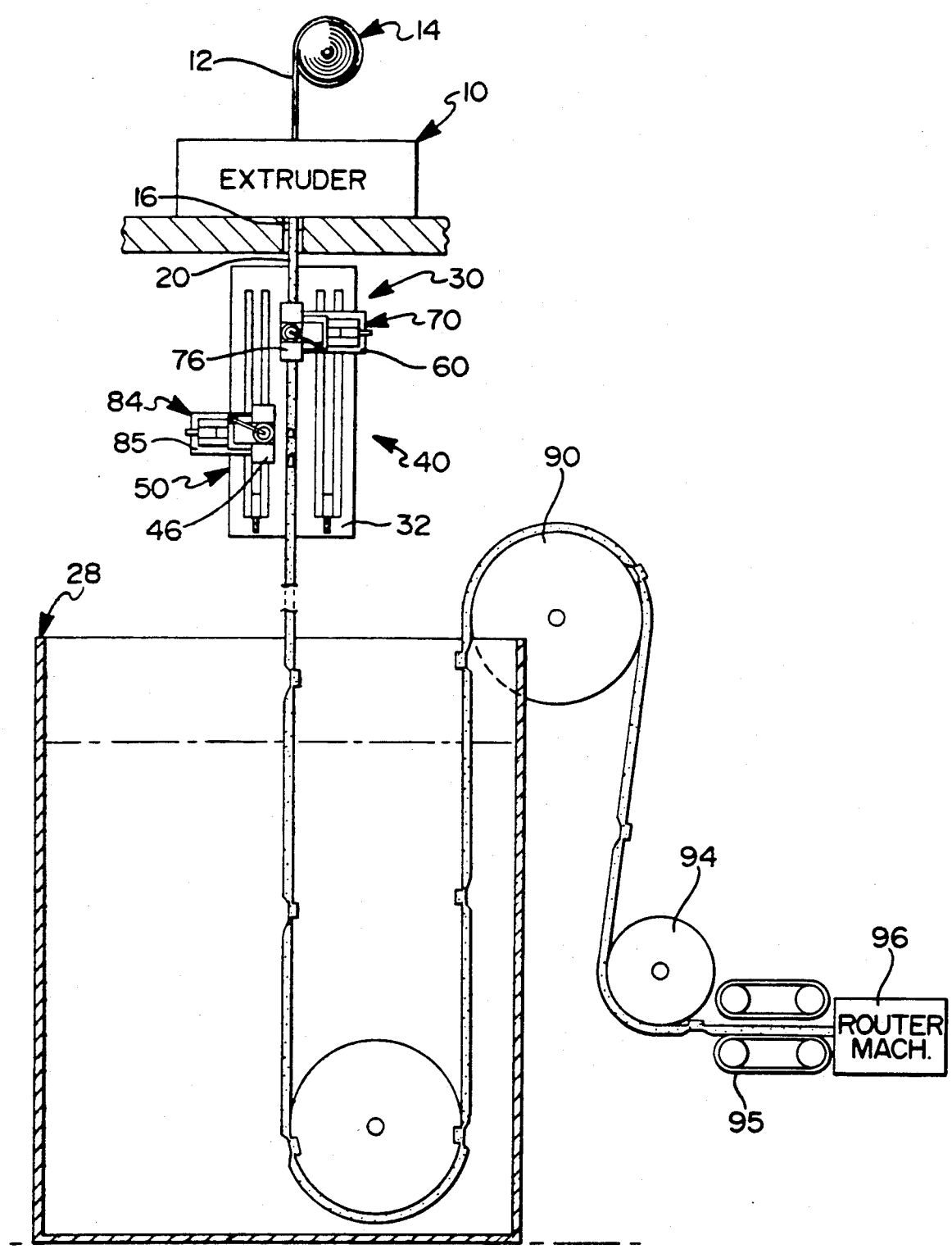
FIG. 2 is a schematic of the equipment setup of the extrusion shaping process.

In our preferred embodiment, a 2½ inch standard plastic extruder 10 is used for the extrusion coating process. It is obvious that any standard size plastic extruder may be used determined by the size of the extrudate desired. A metal foil 12 is being fed from metal foil roll 14 into extrusion die 16. It is desirable to locate the extruder on an overhead platform and orient the extrusion die 16 such that plastic flow is directed straight down as shown in FIG. 2.

Immediately after the extrudate 20 exits the extrusion die 16, approximately at a distance of 8 to 10 inches from the extrusion die or within 5 seconds after exiting the extrusion die, the extrudate 20 enters into an extensible die shuttle carrier station 30. An enlarged detailed construction of the extensible die shuttle carrier 30 is shown in FIG. 3.

As shown in FIG. 3, the extensible die shuttle carrier 30 is mounted on a fixed position metal plate 32 in a vertical direction situated behind the extrudate 20. Two extensible die shuttles 40 and 50 are mounted on the carrier plate 32 in a parallel relationship. The extensible shuttles 40 and 50 are operated by a reciprocating ball linear motion screw mechanism 42 capable of precision tracking the line speed of the extrudate while producing zero backlash. Our tests have shown that at an extrusion line speed of 15 to 30 feet per minute, an accuracy of 0.001 mm in stop point repeatability can be obtained with our reciprocating ball linear motion screw mechanisms.

The design of the extensible die shuttle is a very important step of our novel extrusion shaping process. The shuttle must be a highly precise mechanical device capable of functioning with exact movement repeatability. It must also be designed to respond to a built-in electronic controller to not only control the shuttle, but also coordinate it with the extruder and the haul off device. The shuttle should also have wide and accurate adjustment capability.

On the reciprocating extensible shuttle 40, a reciprocating precision die carrier 60 is mounted. The reciprocating precision die carrier 60 is operated by an electrical worm gear linear actuator 62 which is directly coupled to a two-way variable speed servo motor (not shown). The linear actuator 62 carries the die carrier 60 and guided by two linear motion travel guides 66. Another linear actuator 58 allows die assembly 70 mounted on the die mounting plates 64 to move laterally in tracking the extrudate. The linear actuator 58 must be able to move precisely and rapidly in the tracking of the extrudate. Locating pins 68 are mounted on the die mounting plates 64 for the mounting of the die assembly.

A quick change molding die clamp assembly 70, as shown in FIG. 3, is mounted on the die mounting plates 64. The die clamp assembly is controlled by a two-way hydraulic valve 72 and a hydraulic solenoid 74. The design of the mounting of the shaping dies 76 and 78 is such that they can be quickly exchanged. The shaping dies should be drilled (not shown) for high volume water flow to provide quick response temperature control to maintain an optimum 60° to 80° F. surface temperature of the dies. This temperature control is desirable in order to set the thermoplastic extrudate and to maintain a surface matching the extruded unshaped section.

Figure 4:
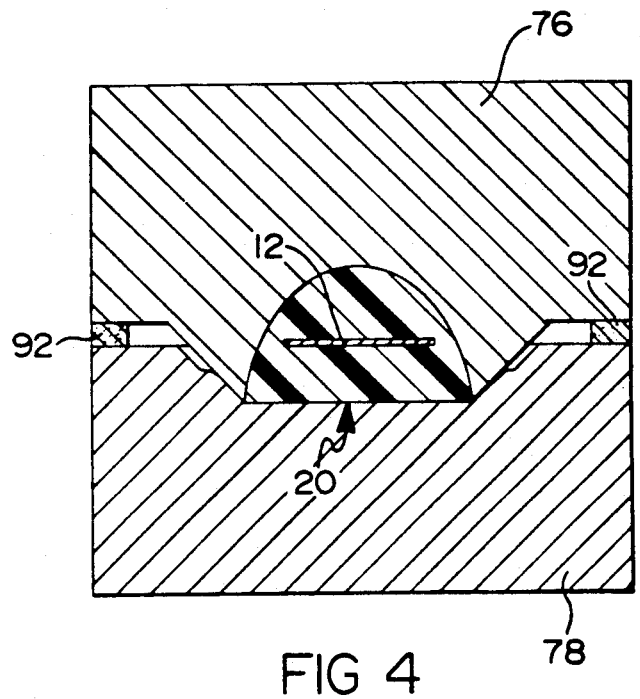
FIG. 4 is an enlarged cross-sectional view of a matched molding die taken along the length of the die.
Figure 5:
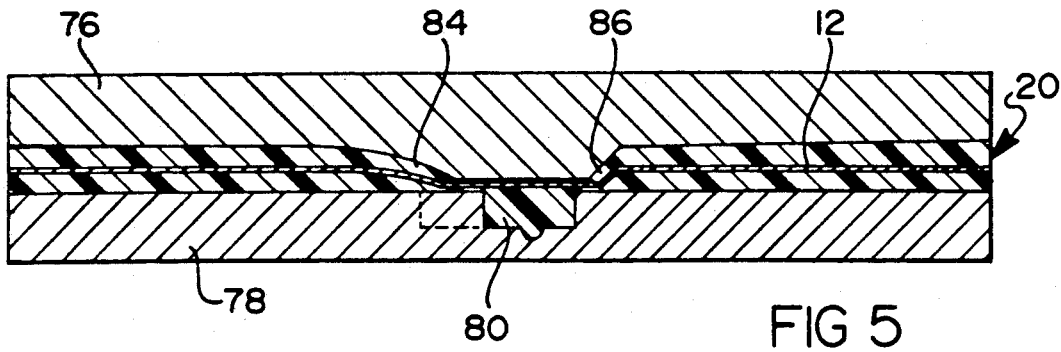
FIG. 5 is an enlarged cross-sectional view of the matched molding dies taken along the width of the die.

FIGS. 4 and 5 show enlarged cross-sectional views of the molding dies. FIG. 4 shows a view taken along the length of the die while FIG. 5 shows a view taken along the width of the die. The design of the molding dies is another important factor for the successful practice of our novel invention. The die cavity must be designed to avoid the formation of mold edge marks at the prefinished ends. The elimination of mold marks is accomplished by constructing the opening in the upper female die 76 (FIG. 5) to fade away proportionately from the forming area to the extreme end of the die in both directions, i.e., the trailing end and the leading end. We have discovered that the optimum opening for fade away is approximately 1 mm over 300 mm. Other fade away opening ratios may also produce good parts, but some degree of distortion may be noticeable. Leveling pads 92 (FIG. 4) are provided to better control the leveling of the upper female die 76 and the lower die 78.

Another important design factor to be considered in the construction of the die is that the cavity in the lower die must be precisely cut to accept the material displaced locally during shaping. We have determined that the cavity opening 80 (FIG. 5) must inversely profile the upper die section with a volume that is approximately 1/64 less than the volume displaced. This ratio is required to provide slight back pressure and to prevent sink marks in the shaped extrudate. The lower die 78 is not required to fade away open but it must register the extruded section on center.

The design of the fade away open in the upper die 76 is important in order to eliminate mold marks which tend to form at the point where the mold no longer touches the extrudate. The properly designed tapered fade open also avoids shearing action and minimizes a drag-type defect commonly known as shock lines. By the precise combination of a properly designed fade away open and a suitably sized lower die cavity, smooth finished leading and trailing ends can be obtained on continuous length extrudate. The trailing end and the leading end are shown as 85 and 86 in FIG. 5.

The practice of our novel invention may now be described as follows. In FIG. 2, it is seen that two mold carriers 60 and 85 each mounted on a reciprocating extensible shuttle 40 and 50 are used to engage the extrudate 20 one at a time in a hand-over-hand manner. A set of molding dies 76 and 78 first extends in open position to a point directly over the extrudate 20 and moves down at a speed slightly faster than the movement of the extrudate. When proper speed is attained, molding dies 76 and 78 close and form a leading and trailing end simultaneously. The time between the extrudate exiting the extrusion die and the close of the molding dies on the extrudate is less than 5 seconds. No cooling of the extrudate to any significant degree has occurred within the 5 seconds time period. Molding dies 76 and 78 continuous to move with the extrudate until it reaches a predetermined set point which actuates the second set of molding dies 46 and 48 causing it to close at precise timing to establish the length of the molded part.

The second set of molding dies 46 and 48 then extends to a position directly over the extrudate and moves with the extrudate until a speed slightly faster than the movement of the extrudate is achieved. Molding dies 46 and 48 then close to form a leading and trailing end simultaneously. Molding dies 76 and 78 then open and retract away from the extrusion and quickly returns to home position. When the second set of molding 46 and dies 48 reaches the predetermined set point, molding dies 76 and 78 extend and repeat the sequence.

Repeated actions of molding dies 76, 78 and 46, 48 create a continuous series of formed areas on the extrudate precisely spaced to preset lengths. This continuous extrudate flows directly into a vertical water bath 28 approximately 10 feet deep. It should be noted that in FIG. 2, the extrudate after shaping is rotated 90° to better illustrate extrudate then passes around a combination idler drum/puller mechanism driven at a speed synchronized with the basic extrusion rate. From the idler drum 90, the extrudate is guided into a grooved fixture 94 and pulled by puller 95 through a router machining assembly 96 which removes a thin layer of flash material on the extrudate.

The router 96 is arranged such that the blades just clear the shoulders opposite the groove and shave the flesh and excess material from the lower side of both the leading and the trailing ends. This effectively produces a finished part cut precisely to length which has two formed and finished ends. Our novel process thus produces a continuous series of cut-to-length extruded parts with both ends neatly shaped, ready for application of adhesive tape for mounting purposes.

In an alternate embodiment, we have developed a simpler mold shuttle mechanism which eliminates the need for horizontal lateral movement. This is shown in FIG. 6.

In our alternate embodiment, the horizontal acting carriers are replaced by a pair of power jaw clamps 106 and 108 which allow the molding dies 110 and 112 to pass during vertical movement. The alligator type jaws are designed to open wide enough to allow the opposite clamp and mold dies to pass between them in closed position.

All other machine functions would be the same as that in the preferred embodiment except for the fact that opening and closing of the power jaws must be coordinated and fitted with safeties to ensure that one clamp is open and one is closed anytime the two pass each other.

As shown in in FIG. 6, starting at home position with the mold carrier 102 full up toward the extrusion die and the other mold carrier 104 full down at the end of travel the extrusion is started to establish proper extruded profile and line speeds. Once the extruder has reached equilibrium and is making an acceptable profile, the mold carrier mechanism begins to function. Mold carrier 102 advances, attains line speed, and forms a leading and trailing end into the extrudate. Simultaneously mold carrier 104 quickly moves to full up position. Mold carrier 102 continues to advance until a preset point is reached which causes mold carrier 104 to advance, attain line speed and close onto the extrudate. Once carrier 104 is closed, carrier 102 opens and returns to full up position. Meanwhile carrier 104 continues to advance until it reaches a preset point which signals mold carrier 102 and causes it to advance, attain line speed, and close.

These actions continue in precise harmony creating a continuous length of extrudate with ends formed equally spaced over its length. All of these operations occur at full line speed with no stops or pauses.

While our invention has been described in terms of a preferred embodiment and an alternate embodiment thereof, it is to be appreciated that those skilled in the art will readily apply these teachings to other possible variations of the invention.

The embodiments of the invention in which an exclusive property or privilege is claimed are defined as follows:

1. A method of extruding a profiled strip of polymeric material off the extrusion die of a plastic extruder at a fixed speed and thereafter without cooling said strip compression forming a predetermined section of said profiled strip into a predetermined shape when temperature of said polymeric material being sufficiently high allowing plastic flow in said profiled strip, said method comprising the steps of:
   A. extruding a profiled strip of polymeric material through said extrusion die;
   B. compression molding a predetermined section of said profiled strip into a predetermined shape within 5 seconds after exiting said extrusion die without substantial cooling of said strip when said profiled strip maintains a temperature of no less than 200° F. with a set of compression molding dies capable of traveling with the profiled strip at substantially the same speed for a sufficient length of time to permanently set said predetermined shape;
   C. disengaging said compression molding dies from said profiled strip at a predetermined distance from said extrusion die;
   D. cooling said profiled strip having said compression molded predetermined shape in a suitable cooling fluid such that said predetermined shape is permanently maintained; and
   E. trimming said extruded profiled strip into discontinuous pieces each having said compression molded predetermined shape.

2. A method of extruding a profiled strip of polymeric material off the extrusion die of a plastic extruder at a fixed speed and within 5 seconds thereafter without cooling said strip compression forming a predetermined section of said profiled strip into a predetermined shape when temperature of said polymeric material being sufficiently high allowing plastic flow in said profiled strip, said method comprising the steps of:
   A. extruding a profiled strip of polymeric material through said extrusion die;
   B. compression molding a predetermined section of said profiled strip into a predetermined shape within 5 seconds after exiting said extrusion die without substantial cooling of said strip with a set of compression molding dies capable of traveling with the profiled strip at substantially the same speed for a sufficient length of time to permanently set said predetermined shape, said compression molding dies equipped with a fade away open of at least 1 mm per 300 mm die length;
   C. disengaging said compression molding dies from said profiled strip at a predetermined distance from said extrusion die;
   D. cooling said profiled strip having said compression molded predetermined shape in a suitable cooling fluid such that said predetermined shape is permanently maintained; and
   E. trimming said extruded profiled strip into discontinuous pieces each having said compression molded predetermined shape.

3. In the method of claim 2, said polymeric material being selected from the group consisting of polyvinyl chloride, polyethylene, polypropylene, and acrylonitrile-butadiene-styrene polymer.

4. In the method of claim 2, said compression molding dies are further equipped with cooling means to maintain said dies at a temperature between 50° to 90° F.

5. In the method of claim 2, said predetermined shape being a leading end and a trailing end of a molding piece.

6. In the method of claim 2, said profiled strip being a reinforcing metal foil extrusion coated with said polymeric material.

* * * * *